J. KREMENEZKY.
APPARATUS FOR WORKING GLASS IN THE HEAT.
APPLICATION FILED SEPT. 17, 1908.

928,670.

Patented July 20, 1909.

UNITED STATES PATENT OFFICE.

JOHANN KREMENEZKY, OF VIENNA, AUSTRIA-HUNGARY.

APPARATUS FOR WORKING GLASS IN THE HEAT.

No. 928,670.   Specification of Letters Patent.   Patented July 20, 1909.

Application filed September 17, 1908. Serial No. 453,500.

*To all whom it may concern:*

Be it known that I, JOHANN KREMENEZKY, a subject of the Emperor of Austria-Hungary, residing at Vienna, Empire of Austria-Hungary, have invented certain new and useful Improvements in Apparatus for Working Glass in the Heat; and I do hereby declare the following to be a full, clear, and exact description of the invention, such as will enable others skilled in the art to which it appertains to make and use the same.

This invention relates to apparatus for working glass in the heat. Such apparatus are more particularly designed for working the bulb blanks of electric incandescent lamps on sealing into them the filament carriers with the filaments mounted thereon but it is also applicable in many other cases for similar purposes.

Figure 1:
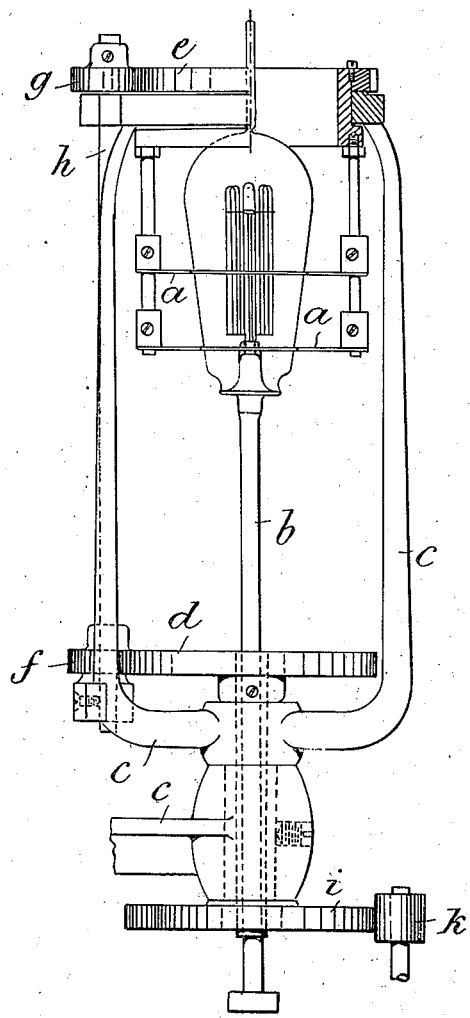
Figure 2:
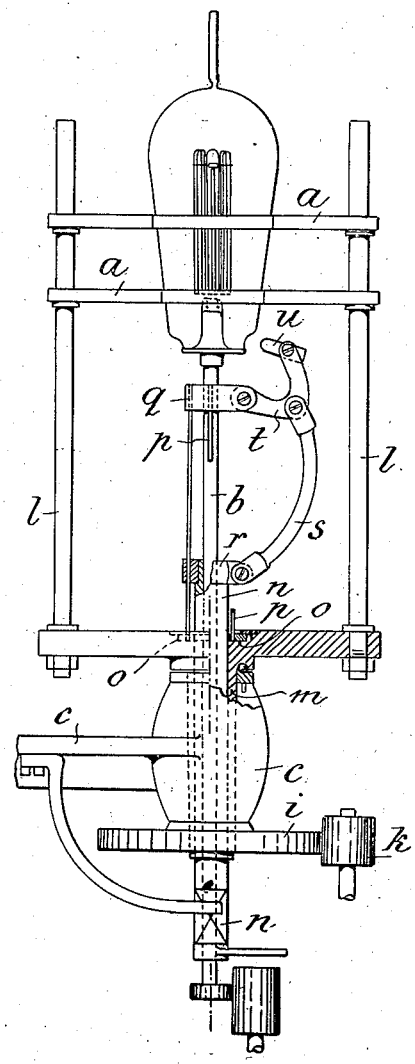

In the accompanying drawing Figure 1 is a side elevation partly in section of the improved apparatus. Fig. 2 is a similar view of a modification of the apparatus.

In the apparatus shown and designed more particularly for sealing the filament carriers into the bulbs of electric incandescent lamps, $a$ $b$ are two parts coupled together so as to revolve around the same axis simultaneously and serving for holding the glass parts to be worked. As shown $a$ is the double ring for supporting the bulb blank and $b$ is the spindle for supporting the filament carrier. Either or both of these parts may be adjustable axially relatively to the well known blow pipe apparatus not shown in any known or suitable manner for instance that used in the ordinary sealing in machine for enabling any part of the glass articles to be heated at will.

So far the present apparatus is similar to the sealing in machines now in use. According to Fig. 1 the two parts $a$ $b$ are journaled in a stationary support $c$ and are provided with toothed or friction wheels $d$ $e$ which are coupled by pinions or rollers $f$ $g$ (respectively on a common shaft $h$). Any one of these parts, as shown the spindle $b$ is revolved in any suitable way, as shown by toothed or friction gearing $i$ $k$.

In the modification shown in Fig. 2 the double ring $a$ is carried by a frame $l$ journaled in the stationary support $c$ and having its hollow shaft $m$ driven by a toothed or frictional gearing $i$ $k$.

In the construction shown in Fig. 1 only the glass parts to be worked (for instance as shown in this figure the bulb blank and the filament carrier of an electric incandescent lamp) revolve in the stationary support $c$. This enables the glass softened by the flames of the blow pipe apparatus to be worked by applying against the same a suitable tool by hand.

In the construction shown in Fig. 2 the frame 1 revolves together with the glass so that the tool cannot be applied by hand against the glass. In order to enable the glass to be worked in the apparatus shown in Fig. 2 through the hollow shaft $m$ another hollow shaft $n$ carries at its upper end extending into the frame $l$ a head $r$ pivotally connected by a link $s$ with a lever $t$ having its fulcrum on a ring $q$, this ring is supported by rods $p$ passing freely through the head $r$ and secured to a plate $o$ free to revolve in the frame $l$ but prevented from moving axially in the same. The lever $t$ carries at its outer end a roller or arm $u$ acting as a tool for working the glass. The rods $p$ thus couple the ring $q$ and the plate $o$ with the spindle $n$ so that they do not revolve with the frame $l$. If now the hollow shaft $n$ is raised by hand the head $r$ slides along the rods $p$ and thus through the medium of the links $s$ causes the lever $t$ to be turned as the ring $q$ is prevented from moving axially by the plate $o$ and the rods $p$. Thus the tool $u$ can be applied against the glass with a pressure that can be adjusted at will whereby the soft glass can be worked as may be required while the frame $l$ revolves together with the glass around the stationary spindle $n$ without being impeded by the head $r$ and the ring $q$. The spindle $b$ which as shown serves to fold the filament carrier passes through the inner hollow shaft $n$ and is free to revolve in and to move longitudinally relatively to the same. The spindle $b$ is coupled with the outer shaft $m$ in any suitable manner for instance by a gearing as indicated.

The present apparatus permits the glass softened by the blow pipe apparatus to be worked in the same way as clay is worked on the throwing mill either by applying tools by hand (in the construction shown in Fig. 1) or mechanically (Fig. 2) which is advantageous for many purposes and more particularly for the manufactured electric glow lamps. In the latter case in sealing in the filament carrier the bulb may be given such a shape that it can be fitted into the normal socket even if the supporting frame and the filaments mounted on the filament carrier have a width notably greater than the diameter of the normal socket which is the case for instance in metal filament lamps. The invention thus permits to construct metal filament lamps directly for normal sockets and thus to dispense with the sleeves attached to such sockets which heretofore have been necessary for holding the lower part of the bulb and which sleeves had to be insulated from the socket for the sake of safety so that they were expensive. The construction shown in Fig. 1 moreover offers the advantage that the flames of the blow pipe apparatus act absolutely uniformly all around the glass while, in the construction shown in Fig. 2 as well as in the ordinary sealing in machine the vertical parts of the frame $l$ prevent the direct action of the flames on certain parts of the glass. The construction shown in Fig. 2 is more particularly designed for existing sealing in machines to enable them to be readily and cheaply arranged in accordance with the present invention. Of course in the construction shown in Fig. 1 too the tools may be secured to the stationary support $c$ or to any other stationary part in a manner similar to that used in turning lathes instead of applying such tools to the glass by hand.

Claims—

1. In an apparatus for working glass in the heat, the combination of a stationary support, a frame adapted to revolve around an axis in the stationary support, parts adapted to hold the glass to be worked and carried by such frame, means for adjusting the glass axially and means connected to the stationary support for holding tools and for applying them to the glass, such latter means being entirely within the said revolving frame, substantially as and for the purpose described.

2. In an apparatus for working glass in the heat, the combination of a stationary support, a frame adapted to revolve about an axis in said stationary support, parts carried by said frame and adapted to hold the glass to be worked, means for adjusting the glass axially, an outer hollow shaft journaled in the stationary support and carrying said revolving frame, an inner hollow shaft passing through the outer hollow shaft, a plate free to revolve in said frame, rods supported by said plate, a ring carried by said rods, a lever pivoted to said ring, a head secured to the inner hollow shaft, a link connecting said lever to said head, means for preventing the inner hollow shaft from revolving relatively to the stationary support, means for moving the inner hollow shaft axially in the outer hollow shaft, and means for preventing the axial movement of said plate relatively to the outer hollow shaft, substantially as described.

In testimony whereof, I affix my signature, in presence of two witnesses.

JOHANN KREMENEZKY.

Witnesses:
JOHN GEORGE KOUDY,
ROBERT W. HEINGARTNER.